Nov. 21, 1961     A. JOSEPHS     3,009,491
PORTABLE POWER SAW GUIDE ATTACHMENT
Filed Aug. 23, 1960
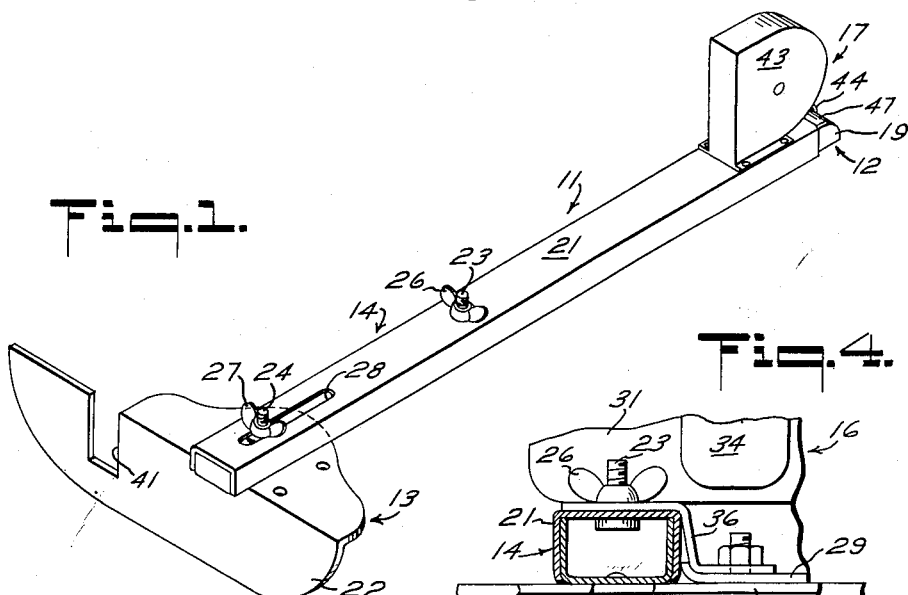
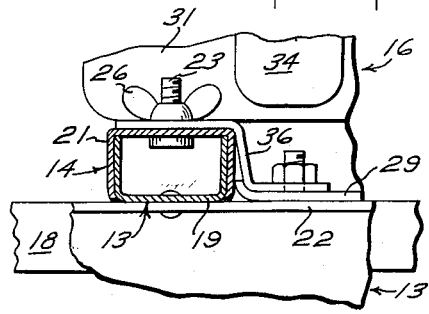
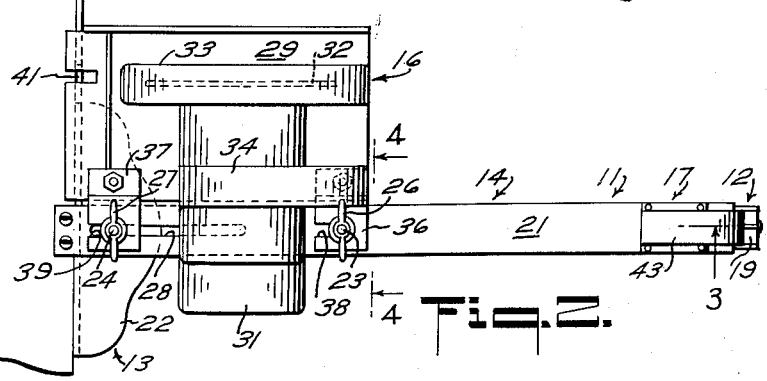
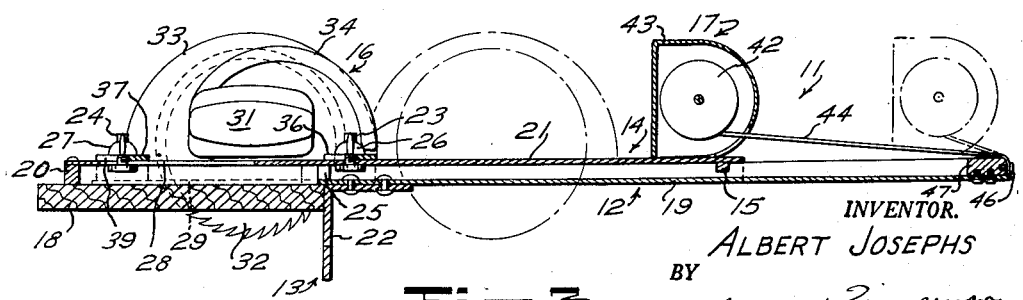
INVENTOR.
ALBERT JOSEPHS
BY
Gardner & Zimmerman
ATTORNEYS

United States Patent Office 3,009,491
Patented Nov. 21, 1961

3,009,491
PORTABLE POWER SAW GUIDE ATTACHMENT
Albert Josephs, 3425 Rubin Drive, Oakland, Calif.
Filed Aug. 23, 1960, Ser. No. 51,362
4 Claims. (Cl. 143—47)

This invention relates to a guide for a portable power saw or the like which enables saw cuts to be made transversely across a board of lumber in a quick and simple manner.

A number of guides are well known for use with motor driven hand saws to guide the saw along a straight path transversely across a board of lumber. Conventional guides of this type, however, have been so cumbersome or unwieldly in their construction as to substantially preclude one handed manipulation of the saws employed therewith. This is, of course, undesirable in many wood cutting operations, particularly those where it is necessary to transversely cut off a board that is positioned at a highly elevated location above the floor or ground level.

It is, therefore, an object of the invention to provide an improved guide for a power driven hand saw which facilitates one handed manipulation thereof.

Another object of the invention is the provision of an extremely simple and compact guide attachment for a Skilsaw which facilies rapid accurate cutting transversely across a board of lumber at right angles to the longitudinal edge thereof without requirement of a guide line being first drawn across the board.

It is still another object of the invention to provide a guide of the class described which includes means for stabilizing the travel of a saw employed therewith and returning the saw to an inoperative position.

It is a further object to provide a guide of the class described which is readily adjustable to use with a variety of types and sizes of power hand saws.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of the portable saw guide attachment of the present invention, FIGURE 2 is a plan view of the guide with a portable saw attached thereto, FIGURE 3 is a vertical sectional view taken on line 3—3 of FIGURE 2 showing the saw cutting through a work piece; and FIGURE 4 is a transverse sectional view taken on line 4—4 of FIGURE 2.

Referring now to the drawing, a guide attachment 11 in accordance with the present invention is seen to generally comprise an elongated fixed arm member 12 secured at one end in preferably right angular T relation to a relatively shorter work piece engaging member 13. A movable arm member 14 is mounted for translation longitudinally of the fixed arm 12 and is adapted for fixed attachment of a portable motor driven hand saw 16 (see FIGURE 2) thereto. In addition, the guide is preferably provided with a return spring mechanism 17 coupled between the fixed and movable arms 12 and 14 for automatically returning the movable arm and saw mounted thereon to an inoperative position, as depicted in FIGURE 2 and in phantom line in FIGURE 3, after the movable arm is extended forwardly relative to the fixed arm to an operative position, as depicated in full line in FIGURE 3. The mechanism 17 further serves to stabilize the travel of the saw 16 by the tension exerted by the mechanism against movement of the movable arm 14.

Thus, with the saw 16 mounted upon the movable arm 14 of guide attachment 11, the work piece engaging member 13 thereof may be brought into abutment with a longitudinally extending edge of a length of board 18, as shown in FIGURES 2 and 3, to thereby position the saw at right angles to the edge. The saw may then be manually moved across the board upon movable guide arm 14 to thus cross cut the board. During the cutting operation the saw travel is stabilized by the tension exerted by the spring return mechanism 17, and moreover when the board is cut in two the mechanism returns the saw mounted upon the movable arm 14 to its inoperative position. By virtue of the compactness of the T arrangement of the guide members, the saw is readily manipulated with one hand in the accomplishment of the cross cutting operation.

Considering now more specifically the preferred structure of guide attachment 11, it is to be noted that fixed and movable arm members 12 and 14 are both preferably provided as elongated channel members 19 and 21 respectively. The work piece engaging member 13 is then best provided as an angle bracket 22 having its horizontal leg rigidly attached, as by riveting, to the web of channel member 19 at a position slightly spaced from one end in the previously noted right angular T relationship. The end of the fixed channel 19 thus projects slightly beyond the vertical leg of the angle 22 and the latter depends from the web of the channel in transverse right angular relation thereto. The vertical leg of the angle may consequently be placed in abutment with an edge of the board 18 and the web of the channel 19 at its projecting end will rest upon the upper surface of the board with the parallel legs of the channel projecting upwardly, as best shown in FIGURE 4.

With the parallel legs of fixed channel member 19 upwardly projecting as noted above, slidable mounting of the movable channel member 21 longitudinally thereof is simply facilitated by providing the movable channel as having a slightly greater web span than the fixed channel. The movable channel member 21 is then readily placed with its parallel legs projecting downwardly over the upwardly projecting legs of the fixed channel member 19 in slidable telescoping engagement therewith. It is desirable to limit longitudinal movement of the channel 21 relative to the fixed channel 19 so as to prevent disengagement of the two channels. Therefore, stop members 15 and 20 are provided at either end of the movable channel 21 whereby longitudinal movement thereof is limited in either direction by abutment of such stop members against a block 25 secured to the fixed channel 19 at the end which carries the angle bracket 22.

In order that a variety of different portable saw types and sizes may be easily fitted and attached to the guide 11, a pair of mounting bolts 23, 24 threading wing nuts 26, 27 are carried by the web of the movable channel member 21 and are arranged to be readily adjustable in the longitudinal spacing therebetween. To this end the bolt 23 is preferably fixed in position by the bolt extending upwardly through an aperture in the web of the channel, the wing nut 26 being threadably secured to the projecting end of the nut. The bolt 24, on the other hand, is rendered adjustable in its longitudinal position by extension thereof through a longitudinal slot 28 in the web of the channel. The wing nut 27 is secured to the end of the bolt 24 projecting through the slot. Thus the wing nut 27 may be slightly loosened to free the bolt 24 for translation longitudinally of the slot 28, securance of the bolt at any desired position of the slot being accomplished by tightening of the wing nut. Consequently, the spacing between the mounting bolts 23, 24 may be readily adjusted in this manner to conform to the mounting requirements of a variety of existing portable power saws.

As regards more particularly, the attachment of a portable power saw such as the saw 16 to the guide 11, it is first to be noted that such a saw includes a base shoe 29 upon which an electric motor 31 is mounted. A saw blade 32 is secured to the end of the rotary drive shaft of the motor and extends downwardly through a slot or the like at one side of the shoe. In addition, a blade guard 33 is generally secured to the saw in encompassing relation to the portion of the blade above the shoe, while a handle 34 is usually secured to the shoe to facilitate hand manipulation of the saw through a work piece. With saw 16 thus provided, it is readily secured in operable position to the guide by attachment of the opposite side of the base shoe 29 from the blade 32 to the movable channel member 21 by means of the mounting bolts 23, 24. More specifically, a pair of brackets 36, 37 are preferably provided, each having a pair of oppositely projecting vertically spaced legs. One of the legs of the brackets are bolted or otherwise secured to the base shoe at opposite ends of the distal side edge thereof relative to the blade. The upwardly displaced free legs of the brackets 36, 37 are respectively longitudinally slotted as shown at 38, 39 for engagement with the mounting bolts 23, 24. Thus with wing nuts 26, 27 loosened, the slotted leg of bracket 36 may be slipped under the nut 26 and urged into full engagement with the fixed bolt 23. The movable bolt 24 with wing nut 27 secured thereto may then be urged into full engagement with the slotted leg of the other bracket 37 substantially no matter what its particular displacement from the bracket 36. The wing nuts 26, 27 are finally tightened down upon the brackets to complete the attachment of the saw to the guide.

The saw 11 as thus secured to the movable channel member 21 of the guide is disposed with the blade 32 parallel thereto and laterally spaced therefrom. Thus upon movement of the saw secured to the movable channel member longitudinally forward upon the fixed channel member the blade would normally encounter the fixed transverse angle member 22. However, the vertical leg of the angle is provided with a downwardly extending vertical slot 41 to permit passage of the blade 32 therethrough and into cutting engagement with a work piece, such as the board 18, against which the angle member abuts. Inasmuch as the lateral displacement of the saw blade from the opposite edge of the base shoe may vary depending upon the particular type and size of saw, the slot 41 is of a sufficient width to accommodate a range of such lateral displacements.

Considering now more specifically the return spring mechanism 17, it is to be noted that same is preferably provided as a spring loaded spool 42 journalled within a housing 43 and having cable 44 or the like coiled thereon. The housing is rigidly secured atop the web of movable channel member 21 at the opposite end thereof from angle member 22. The free end of cable 44 is rigidly secured to the corresponding end of fixed channel member 19 as by means of a screw binding post 46 threadably engaging a block 47 secured within the end of the channel member. Thus, the spring loading of the spool 42 acts through the cable 44 upon the fixed channel member to establish tension against movement of the movable member relative thereto. This also tends to return the movable member to the inoperable position best depicted in phantom line in FIGURE 3 wherein the cable 44 is substantially entirely wound upon the spool 42. The tension is readily adjusted to the particular requirements of a variety of saws that may be employed with the guide 11 by varying the position along the cable length at which it is attached to the binding post 46. The greater the displacement of the point of attachment from the free end of the cable, the greater is the tension.

What is claimed is:

1. A guide attachment for a portable power saw comprising an elongated fixed channel member, an angle bracket having a horizontal leg transversely secured to the web of said channel member at one end thereof with the vertical leg of the bracket depending from the web of the channel member in transverse right angular T relationship thereto, said vertical leg having a downwardly extending vertical slot in laterally spaced relation to said channel member, an elongated movable channel member disposed in opposition to the fixed channel member and in telescopic engagement therewith, said movable channel member having a longitudinally extending slot in its web and an aperture longitudinally spaced therefrom, a pair of mounting bolts respectively extending upwardly through said slot and aperture, a pair of nuts respectively threadably secured to the ends of said bolts, a spring loaded spool journalled at the opposite end of the movable channel member from the angle bracket for rotation about a transverse axis, and a cable coiled upon said spool and having its free end secured to the opposite end of the fixed channel member from said angle bracket.

2. A guide attachment according to claim 1 further defined by stop means carried by one of said channel members, and a stop engaging block carried by the other of said channel members for engagement with said stop means to limit longitudinal travel of said movable channel member relative to said fixed channel member.

3. A guide attachment for portable power saws comprising an elongated fixed channel arm member, a work piece engaging member secured transversely to an end of said fixed arm member in right angular T relation thereto, a movable channel arm member slidably mounted upon said fixed channel arm member in telescopic engagement therewith with the web sections of the channels being spaced apart, said movable channel arm member having a longitudinally extending slot and a longitudinally spaced aperture in its web, a pair of fastening elements respectively extending upwardly through said slot and aperture for the attachment of a portable power saw thereto in a position with the saw blade laterally spaced from and parallel to said arm members, the said fastening element received in said slot being slidable in said slot so as to provide for adjustable longitudinal spacing of said fastening elements.

4. A guide attachment according to claim 3, further defined by a return spring mechanism secured between said fixed and movable arm members to exert tension against movement of the latter toward said work piece engaging member.

References Cited in the file of this patent

UNITED STATES PATENTS

| 1,608,558 | Hannah | Nov. 30, 1926 |
| 1,960,590 | McKay | May 29, 1934 |
| 2,014,229 | Emmons | Sept. 10, 1935 |
| 2,725,904 | Broster et al. | Dec. 6, 1955 |
| 2,739,624 | Haddock | Mar. 27, 1956 |
| 2,802,493 | Horreland | Aug. 13, 1957 |
| 2,876,808 | Lindheim | Mar. 10, 1959 |
| 2,899,989 | Sells | Aug. 18, 1959 |
| 2,942,633 | King | June 28, 1960 |